United States Patent
Curry

[11] 3,899,188
[45] Aug. 12, 1975

[54] SELF-STEERING BOGIES FOR TRAILERS

[75] Inventor: Norman Royce Curry, Mississauga, Canada

[73] Assignee: Auto Steering Trailers Limited, Mississauga, Canada

[22] Filed: Feb. 11, 1974

[21] Appl. No.: 441,119

[52] U.S. Cl. .............................................. 280/81 A
[51] Int. Cl. ........................ B62d 7/16; B62d 13/00
[58] Field of Search .... 280/81 A, 81 B, 80 R, 80 B, 280/103, 81 R

[56] References Cited
UNITED STATES PATENTS

| | | | |
|---|---|---|---|
| 3,102,735 | 9/1961 | Bigge | 280/81 A |
| 3,311,387 | 3/1967 | Klemm et al. | 280/103 |
| 3,318,613 | 5/1967 | House | 280/81 A |
| 3,338,592 | 8/1967 | Hildebrandt et al. | 280/81 A |
| 3,354,982 | 11/1967 | Schramm | 280/81 A |
| 3,381,974 | 5/1968 | Carter et al. | 280/81 A |
| 3,522,956 | 8/1970 | Sauer et al. | 280/81 A |

FOREIGN PATENTS OR APPLICATIONS 1,233,276  1/1967  Germany .......................... 280/81 A Primary Examiner—Kenneth H. Betts
Assistant Examiner—Jack D. Rubenstein

[57] ABSTRACT

A self-steering bogie for a trailer has a frame with at least one fixed rear axle and with a front axle having, at its ends, steerable stub axles connected to the front axle by forwardly located king pins. Above the frame is an intermediate slide that can be adjusted longitudinally along the underside of the trailer. Fixed to the slide is a first swivel, consisting of a vertical shaft on which said frame is journalled. Cranks extend from either side of the shaft below the frame, and links extend forwardly from said cranks along the underside of the frame to cranks of a second swivel having a vertical shaft journalled on the bogie near the front axle. Track rods extend from another crank of the second swivel to steering cranks on the stub axles.

13 Claims, 7 Drawing Figures

PATENTED AUG 12 1975 3,899,188

SHEET 2

SELF-STEERING BOGIES FOR TRAILERS

BACKGROUND OF THE INVENTION

1. Field of the Invention

This invention relates to self-steering bogies for trailers.

2. Description of the Prior Art

It is known to provide, at the rear of a trailer pulled by a road tractor, a bogie that has a steerable front axle. Such a bogie can improve the stability of the trailer when rounding a curve, and can reduce tire scuffing and tendency to jacknife. However it has been a problem to provide bogies which are reliable, of low height, and easily adjusted to suit different trailers.

SUMMARY OF THE INVENTION

A bogie constructed in accordance with the present invention has two individually steerable front wheels connected by linkages to a swivel that is securable at the underside of the trailer and that turns with the trailer when it rounds a curve. The bogie has a frame journalled on the swivel. Turning of the swivel causes steering linkages to turn another swivel that is rotatable on the bogie, thus causing dray links to steer the front wheels of the bogie. The arrangement permits the bogie to be of an acceptably low height, and the linkages can easily be adjusted to ensure that the bogie steers properly. The swivel on which the bogie frame is journalled is preferably fixed to an intermediate slide above the frame, the slide being adjustable longitudinally of the trailer, with means to impose limits on the rotation of the frame relative to the slide, and to lock the frame relative to the slide to facilitate backing.

BRIEF DESCRIPTION OF THE DRAWINGS

A preferred embodiment of the invention is illustrated by way of example, and somewhat diagrammatically, in the accompanying drawings, in which.

DESCRIPTION OF THE PREFERRED EMBODIMENT

Figure 1:
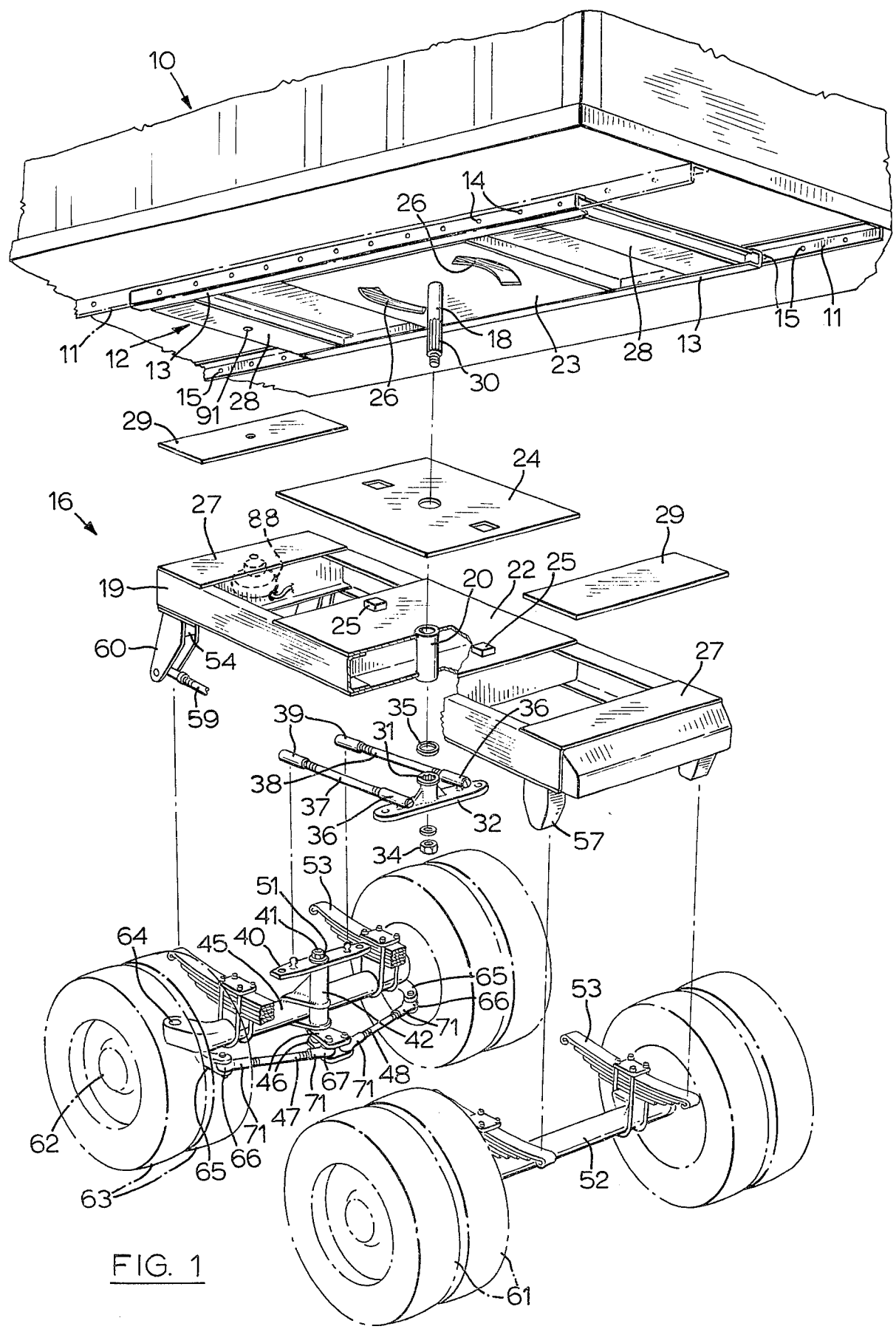
FIG. 1 is a exploded perspective view of a self-steering bogie below the rear end of a trailer.

Referring to FIG. 1 of the drawings, a trailer 10 has affixed to its underside a pair of parallel, longitudinally extending angle irons 11. Adjustable longitudinally between the angle irons 11, at the rear of the trailer, is a rectangular slide generally indicated by reference numeral 12. The slide has side channels 13 provided with longitudinally spaced apart holes 14 that can be aligned with similar holes 15 in the angle irons 11 so that pins (not shown) can be passed through aligned holes to fix the position of the slide longitudinally of the trailer.

The longitudinal position of the slide determines the longitudinal position of a bogie 16 at the underside of the trailer and thus determines the weight distribution between the bogie 16 and tractor wheels 17 (FIG. 7) supporting the front end of the trailer 10.

Figure 4:
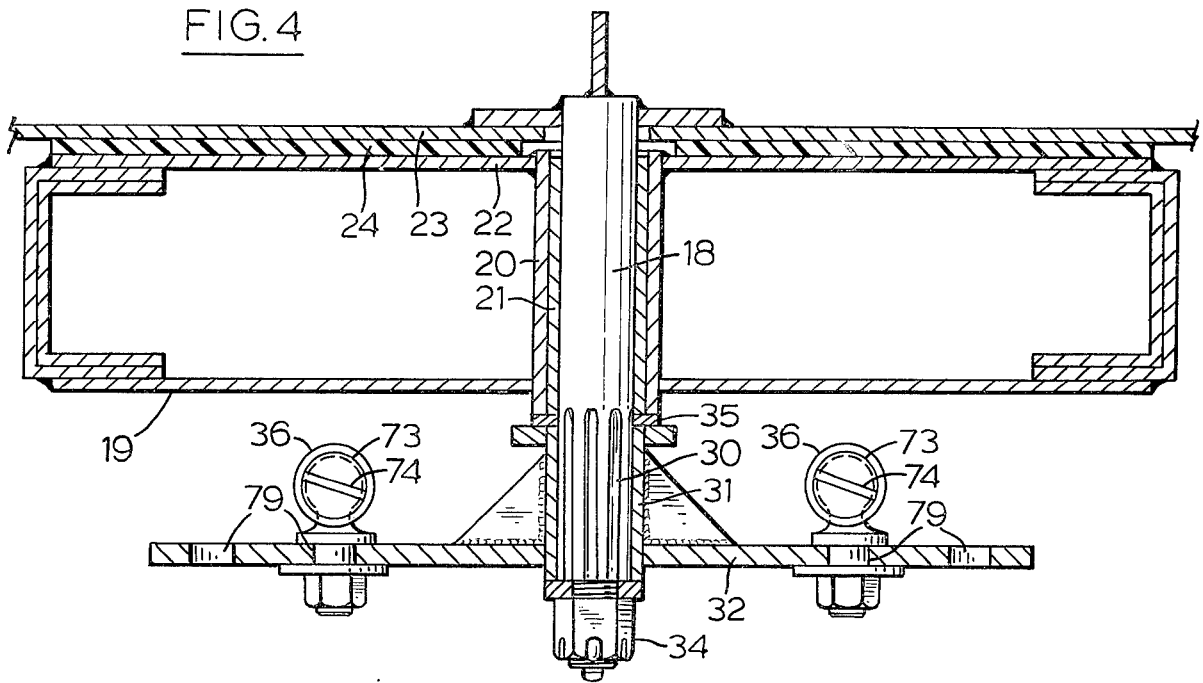
FIG. 4 is an enlarged sectional view taken along the line 4—4 in FIG. 2.

Rigidly fixed to the center of the slide 12 is a downwardly extending vertical torque shaft 18. (The shaft may be bolted to the slide, rather than welded thereto, for ease of removal.) Because the shaft 18 is fixed to the slide 12 the shaft is thereby fixed to the trailer 10 and must turn as the trailer turns to round a corner. Journalled on the shaft 18 is a rectangular frame 19 of the bogie 16, the frame 19 having a shaft-receiving vertical sleeve 20 lined with a bushing 21 (FIG. 4). Across the top of the frame 19 is a bearing plate 22 matching a similar bearing plate 23 at the underside of the slide 12. A Teflon (trade mark) bearing pad 24 is interposed between the plates 22, 23. The plate 22 has a pair of upstanding posts 25 which register with arcuate slots 26 in the plate 23, and the ends of the slots 26 limit the angle through which the bogie frame 19 can turn on the shaft 18 relative to the trailer. When the posts 25 have been inserted through the slots 26, caps (not shown) are bolted onto the tops of the posts to prevent them from being withdrawn from the slots, to provide insurance against the frame 19 being separated from the slide 12 and trailer 10. At the ends of the frame 19 are transverse plates 27 matching similar plates 28 of the slide 12, and Teflon (trade mark) bearing pads 29 are affixed to the plates 27 to reduce friction as the bogie frame turns on shaft 18.

Figure 5:
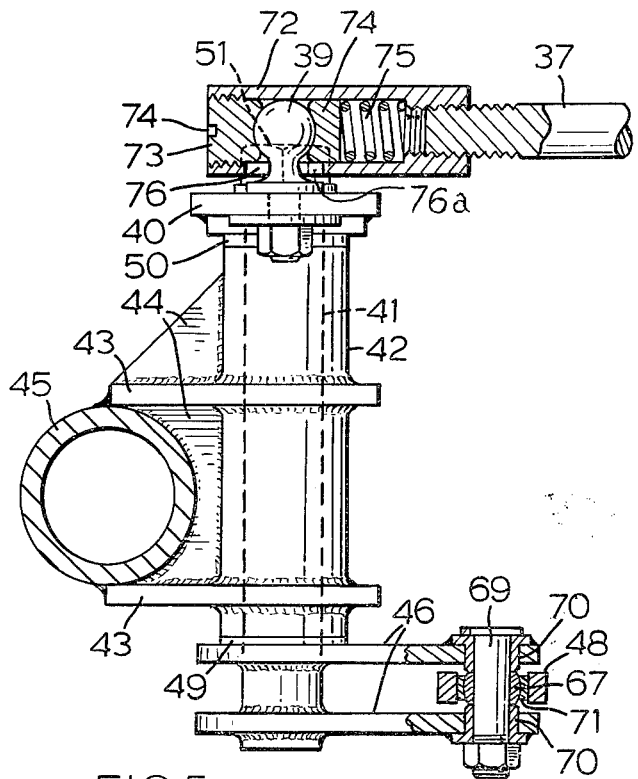
FIG. 5 is an enlarged side view of the forward part of the steering mechanism supported from the front axle of the bogie.

The lower part of the shaft 18 is splined externally at 30, and onto the splined shaft is slid the internally splined hub 31 of a transverse crank member 32, so that the crank member 32 is fixed to the shaft 18, being held by a nut 34 screwed onto the lower end of the shaft 18 and pinned there. A thrust bearing 35 is interposed between the hub 31 and the sleeve 20 of the bogie frame 19 to ensure free relative rotation of the frame 19 and shaft 18 about the vertical shaft axis. Arms of the crank member 32 extend from opposite sides of the shaft 18, and near their outer ends the crank arms are connected through universal joints at 36 to a pair of drag links 37, 38. These drag links extend forwardly, generally parallel to each other, close to the underside of the bogie frame 19 and are connected, by universal joints 39 at their forward ends, to crank arms of another transverse crank member 40. The crank member 40 is affixed to the upper end of a relay member in the form of a second vertical torque shaft 41, the crank member 40 extending from opposite sides of the shaft 41. The shaft 41 is journalled to rotate, about its vertical axis, in a suitably bushed sleeve 42 that (as best seen in FIG. 5) is fixed by means of horizontal brackets 43 and vertical gusset plates 44 to a front axle 45 of the bogie 16. Fixed to the lower end of the shaft 41, to rotate therewith, are a pair of rearwardly extending arms 46 constituting a lower crank for operating track rods 47, 48, as described hereinafter. A thrust bearing 49 is interposed between the upper arm 46 and the lower end of sleeve 42, and a similar bearing 50 is interposed between the upper end of sleeve 42 and the crank member 40. The crank member 40 is splined to the shaft 41 and held in position by a nut 51 tightened on to the upper end of the shaft and pinned there.

The front axle 45 of the bogie 16, and a rear axle 52 thereof are connected by a suitable suspension to the bogie frame 19. The drawings illustrate, only diagrammatically, a suitable equalizing suspension, similar to one described in U.S. Pat. No. 3,186,731 issued June 1, 1965 to A. J. Industries, Inc.

Figure 2:
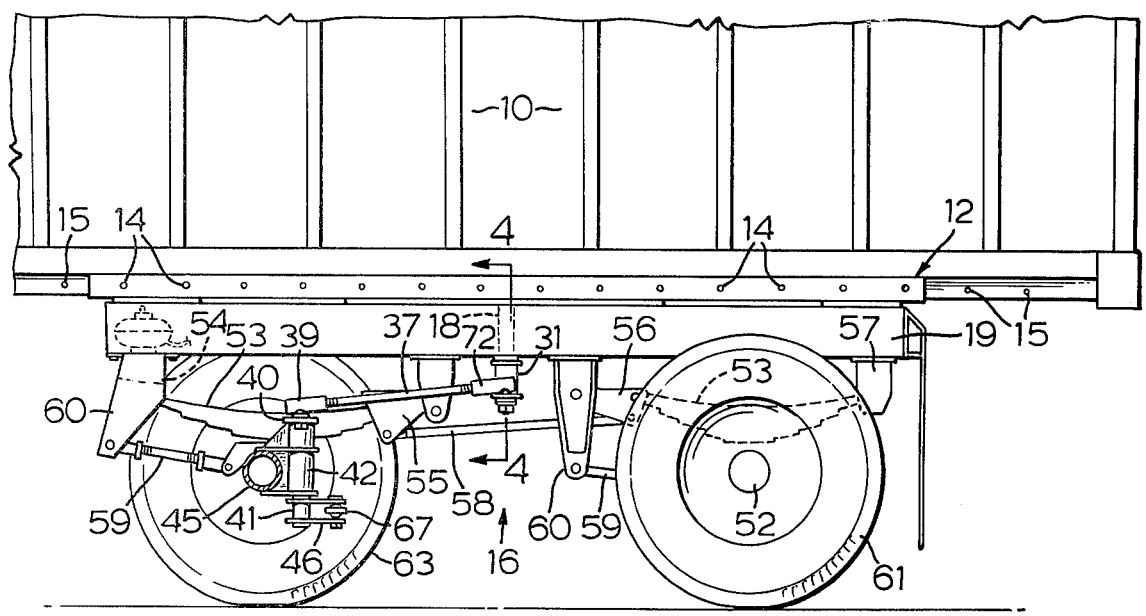
FIG. 2 is a side view of the bogie installed under the trailer.

Referring to FIG. 2, leaf springs 53, clamped to the axles 45, 52, bear at their ends on shoes 54, 55, 56, 57 connected to the bogie frame 19, the intermediate shoes 55, 56 being pivotally connected through linkages 58. Tie rods 59 connect the axles to brackets 60 fixed to the bogie frame.

The rear axle 52 is a fixed nonsteerable axle with wheels 61 thereon. The front axle 45 is a fixed axle parallel to the front axle having, at each end, a steerable stub axle 62. Each stub axle 62 has wheels 63 and is connected to front axle 45 by a king pin located at 64 (see FIG. 3) forwardly of the axes of the axles 45, 62. For steering, the stub axles 62 can be pivoted about the vertical axes of the king pins 64 by stub axle steering cranks 65 connected at 66 to the track rods 47, 48. The connections at 66 are universal joints similar to those at 67 (FIG. 5) which connect the track rods 47, 48 to the crank constituted by arms 46. These universal joints include partly spherical bearings 67, supported on pins 69 between abutments 70, and receiving complementary sockets 71 provided in the ends of the track rods.

Because the wheels 63 and front axle 45 are permitted by the suspension to move vertically to some extent, some automatic lengthwise adjustment of the drag links 37 is called for. This may be accomplished by providing rubber mountings for the drag links or, as illustrated in FIG. 5, by use of a self-adjusting universal joint mechanism at each end of each drag link 37, 38. In the illustrated mechanism, a ball 39 is seated in a cylindrical sleeve 72 between complementary socket faces of a threaded end plug 73 and a piston 74. The piston 74 is pressed against the ball 39 by a spring 75, which will yield if the effective length of the drag link must be reduced. The sleeve 72 has a keyhole opening 76 the narrow part 76a of which extends to the right as viewed in FIG. 5 to allow the ball to shift to the right. Such lengthwise adjustment of the drag links will of course be only momentary. The plug 73 is slotted at 74 to facilitate turning the plug to set up and to adjust the mechanism.

The drag links 37, 38 include elongated rods extending between the sleeves 72. The rods screw into the sleeves 72, each rod having a right hand thread at one end and a left hand thread at the other, so that by turning the rod the length of the drag link can be adjusted. The track rods 47, 48 have similar elongated rods, with screw threads of opposite hands engaging sleeves 71 at their ends.

Figure 3:
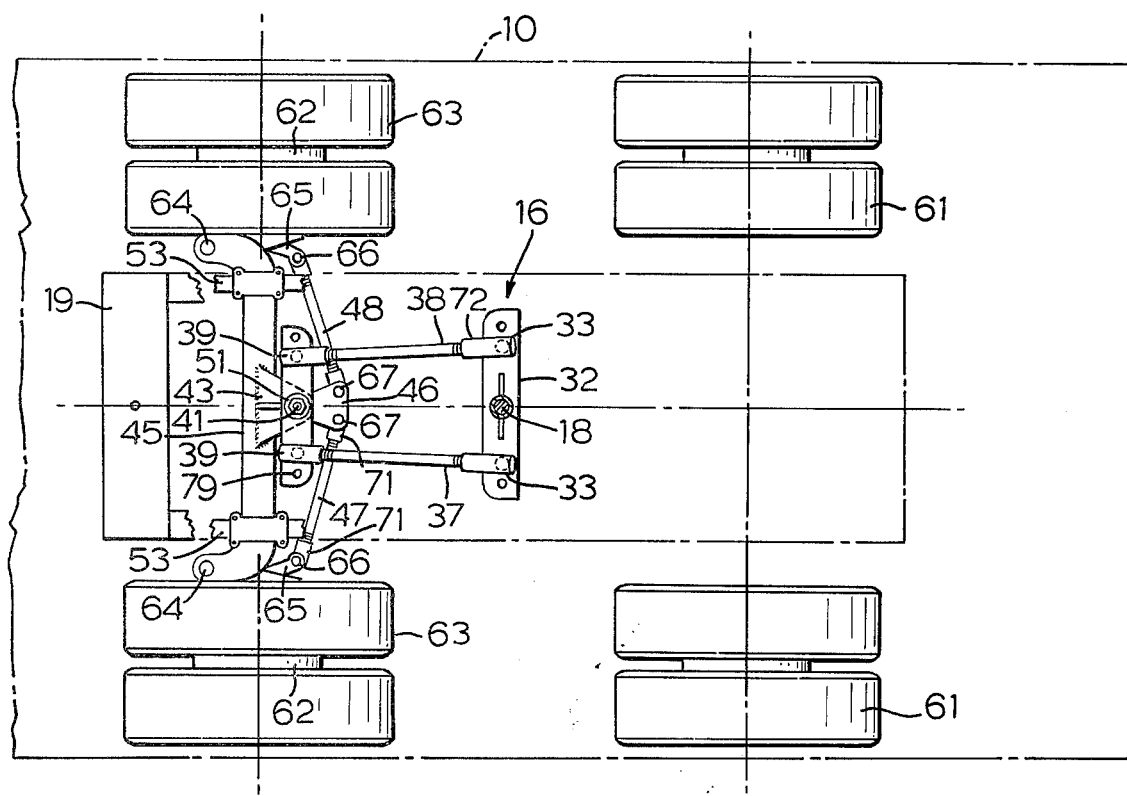
FIG. 3 is a top view of the bogie with parts removed to show the steering mechanism.
Figure 7:
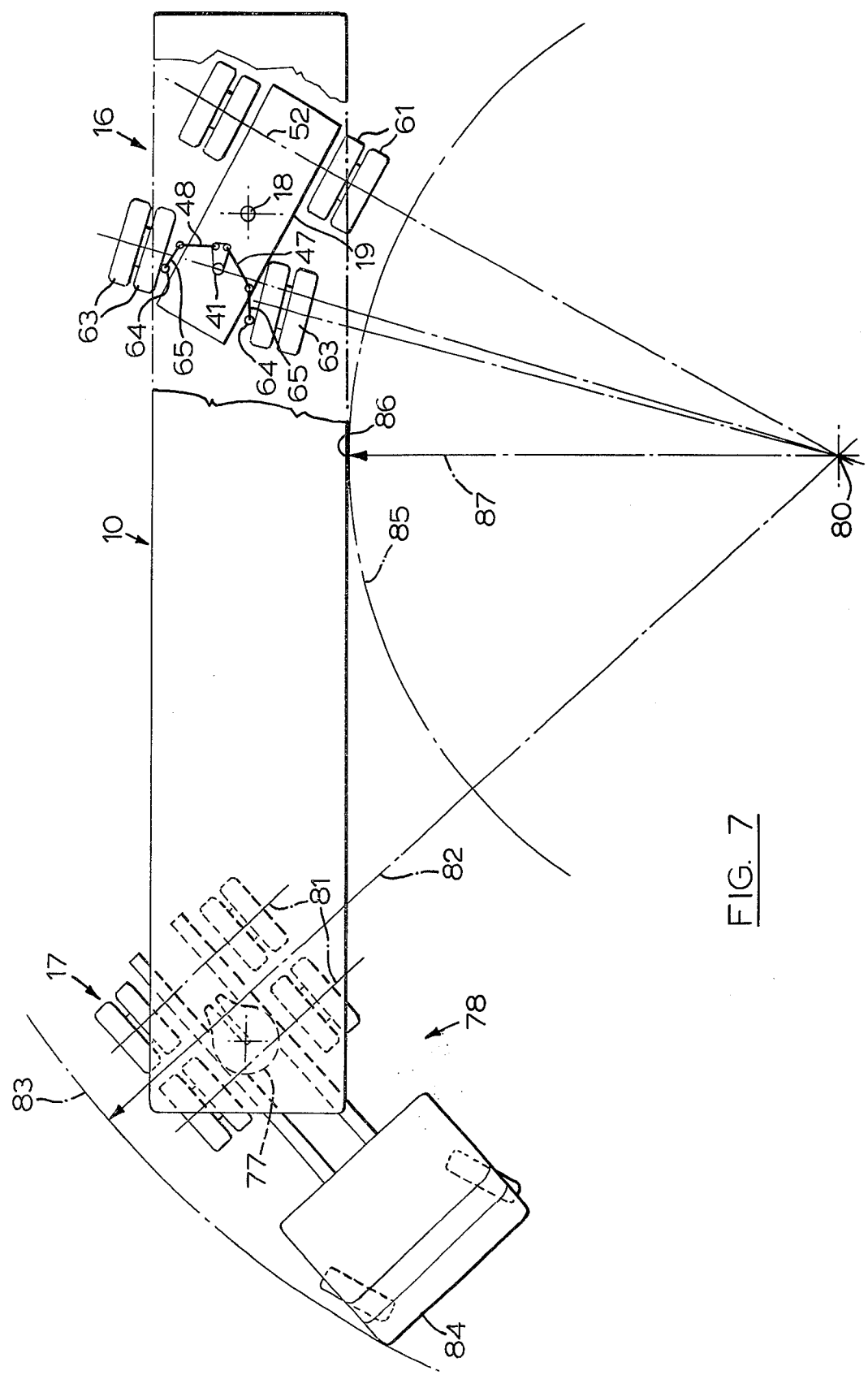
FIG. 7 is a plan view of a tractor-trailer rounding a curve.

The self-steering action of the bogie will now be described. Referring to FIG. 7, the trailer 10 is connected at its front end through a fifth wheel 77 to a truck 78. When the truck is travelling on a curve, the front end of the tailer follows the truck and causes the rear end of the trailer to turn, thus causing the torque shaft 18 to turn (counterclockwise as viewed in FIG. 7) relative to the bogie frame 19. Referring to FIG. 3, the shaft 18 and its crank member 32 constitute a first swivel which thus turns counterclockwise. Through the links 37, 38 the crank member 40 and torque shaft 41 are caused to turn counterclockwise, and the shaft 41 turns its crank arms 46 counterclockwise. Thus, the swivel constituted by the crank member 40, shaft 41 and crank 46 cause the track rods 47, 48, through steering cranks 65, to swing the stub axles 62 counterclockwise about king pins 64. Thus the front bogie wheels 63 turn with the trailer, as shown in FIG. 7.

To set up the steering mechanism, the track rods 47 and 48 are adjusted to be of equal lengths, and the links 37 and 38 are then adjusted to be of equal lengths. If, when the trailer is being pulled straight ahead, the bogie is found to be offtracking slightly to the right, the left hand link 37 will be lengthened slightly by rotating its elongated rod relative to the sleeves 72. Provision may be made for altering the steering geometry by shifting the universal joints 36, 39 inwardly or outwardly along the crank members 32, 40, these members having, for example, a plurality of apertures 79 at which the ball portions of the joints can be mounted.

The steering mechanism is adjusted so that, as the trailer rounds a curve having a center 80 (FIG. 7), projections of the axes of the stub shafts 62 and of the rear axle 52 pass through the center 80. If the bogie 16 is provided with more than one nonsteerable rear axle, the bogie steers so that those rear axles are parallel to a radial line, just as the rear axles 81 of the truck 78 are parallel to a radial line 82.

As shown in FIG. 7, the area swept by the turning tractor-trailer lies between an outer circle 83, traced by the turning cab 84 of the tractor, and an inner circle 85, to which the trailer 10 is tangential at 86 on radial line 87 normal to the trailer, this radial line being the "rear effective axis" of the trailer. With the self-steering bogie of this invention mounted, as illustrated, under a trailer 45 feet long, negotiating a radius (the distance between center 80 and tangential point 86) of 21 feet, the swept area may have a radial dimension of only 20 feet. The torque shaft 18 will normally be located about 8 feet from the rear of a 45 foot long trailer, but can be shifted forward, by adjustment of the slide 12, if the trailer is not fully loaded. Such adjustment does not affect the self-steering action of the bogie: the steering mechanism automatically picks up the least line of resistance because, through shaft 18, its action is mechanically interrelated to the turning movement of the trailer body. Similarly if the bogie is mounted beneath a shorter trailer the steering mechanism will automatically compensate for the shorter length. The maximum permissible swing of the bogie can be reduced by increasing the transverse dimensions of the posts 25.

It is necessary to have clearance between the tops of the wheels 61, 63 and the bottom of the trailer 10 so that the bogie can swing about the shaft 18. This clearance must be sufficient to accommodate vertical movement of the wheels permitted by the suspension. For typical highway use, with the type of suspension illustrated, a clearance of 4½ inches is satisfactory, and thus the trailer body need not be elevated substantially. The steering mechanism has ample road clearance. For off-highway travel it may be desirable to add shock absorbers (not shown) extending outwardly and rearwardly from the front axle 45 to each of the track rods 47, 48 to add stability to the steering on rough terrain.

As compared to a trailer that does not have a self-steering bogie, the bogie that has been described improves the stability and maneuverability of the trailer, avoids tire scuffing, reduces yawing and thus tendency to jacknife, reduces oversteering, and reduces lateral drag and rolling resistance, thus improving fuel economy.

It is advantageous to locate the king pins 64 ahead of the axes of the stub axles 62 and to the inside thereof. With this arrangement, as the bogie rolls forward the front wheels 63 tend to toe outward, thus restoring the stub axles into alignment with each other as the trailer comes out of a curve. Alternatively, there may be used an Ackerman steering axle having inclined king pins at either end of the front axle 45.

Figure 6:
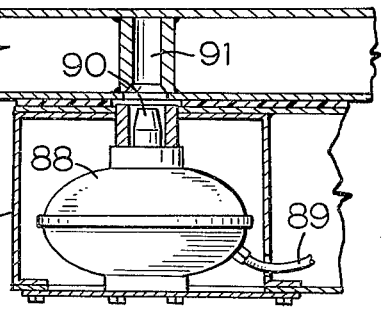
FIG. 6 is an enlarged view of mechanism for locking the bogie to prevent steering when the trailer is being backed up.

When it is desired to back the trailer it is desirable to lock the bogie frame 19 in alignment with the intermediate slide 12 and the trailer body 10. This can be accomplished by actuating a spring return chamber 88 (FIGS. 1 and 6) that is similar in construction to a conventional spring return brake chamber. When air pressure is applied to the chamber 88 through line 89, with the frame 19 and slide 12 in alignment, a plunger 90 is forced upwardly from the frame 19 into a pocket 91 in the slide. When air pressure is released a spring retracts the plunger. The air pressure may be controllable from the tractor cab.

When the trailer is parked it may be desirable to park it with the bogie locked in a position in which it is skewed out of alignment with the trailer (e.g., in the condition shown in FIG. 7), so that if a thief drives off with the trailer the latter will be askew, making driving awkward and the theft obvious. For locking the bogie to the slide in an askew position, to thwart thieves, it is desirable to use a mechanism that cannot be freed without a key.

Modifications to the preferred embodiment herein described will readily occur to those skilled in the art and are intended to be covered by the following claims.

What I claim as my invention is:

1. A self-steering bogie for a trailer, comprising a member rigidly securable at the underside of the trailer to move therewith as the trailer rounds a curve, a bogie frame that can turn at the underside of the frame about a swivel axis, a shaft on said swivel axis, said shaft being fixed against rotation relatively to said rigidly securable member and extending downwardly therefrom through said bogie frame, first crank means rigidly connected to said downwardly extending shaft, a rear axle beneath the rear of the bogie frame, a front axle parallel to said rear axle and beneath the front of the bogie frame, an equalizing suspension system connecting the front and rear axles to the bogie frame, rear wheels supporting said rear axle, front wheels, a steerable assembly supporting said front axle on said front wheels, said steerable assembly including stub axles carrying said front wheels, king pins connecting said stub axles to the ends of said front axle for steering movements relative thereto, track rod means interconnecting the stub axles to maintain a predetermined relationship between their steering movements about the king pins, and drag link means connecting said first crank means and said steerable assembly, and second crank means pivotably connected to the front axle and operatively connected to the track rod means and drag link means to transmit steering movements from said first crank means to said steerable assembly.

2. A self-steering bogie as claimed in claim 1, wherein the steering movement transmission means comprises a relay member journalled on the front axle, said second crank means comprising first and second crank means on said relay member, and the link means connect the crank means on the shaft to the first crank means on the relay member, the second crank means on the relay member being connected to the track rod means.

3. A self-steering bogie according to claim 2, wherein the crank means on the shaft on the swivel axes and the first crank means on the relay member comprise pairs of crank arms extending to opposite sides of the shaft and the relay member respectively, the link means comprise links connecting the crank arms on each side of the shaft to the crank arms on corresponding sides of the relay member, and the track rod means comprise track rods extending from said second crank means on the relay member to the stub axles, the stub axles having steering cranks to which the track rods are connected.

4. A self-steering bogie as claimed in claim 2, wherein the track rods and drag links are connected by universal joints to the crank arms.

5. A self-steering bogie as claimed in claim 4, wherein the track rods and drag links are of adjustable lengths.

6. A self-steering bogie as claimed in claim 2, wherein the links have resilient means that can accommodate length wise adjustment of the links when the front wheels are deflected upwardly.

7. A self-steering bogie as claimed in claim 1, wherein the rigidly securable member is an intermediate slide beneath which the bogie frame is turnable, the slide being adjustable longitudinally along the underside of the trailer.

8. A self-steering bogie as claimed in claim 7, wherein the intermediate slide has means for limiting the angle through which the bogie frame can turn at the underside of the trailer.

9. A self-steering bogie as claimed in claim 7, including means for fixing the frame to the slide when aligned longitudinally therewith to facilitate backing the trailer.

10. A self-steering bogie as claimed in claim 7, including means for locking the frame out of longitudinal alignment with the slide to inhibit theft of the trailer.

11. A self-steering bogie as claimed in claim 1, wherein the king pins are located ahead of the longitudinal center line of the front axle, causing the wheels to urge the stub axles towards alignment with each other as the bogie moves.

12. A self-steering bogie as claimed in claim 1 in combination with a trailer at the underside of which the rigidly securable member is secured.

13. A trailer and a self-steering bogie therefore, the bogie comprising a first vertical shaft secured at the underside of the trailer, at the rear of the trailer, to turn therewith as the trailer rounds a curve, a frame journalled on the first shaft, the frame having at least one rear axle with wheels thereon, a front axle having at its ends stub axles with wheels thereon, and an equalizing suspension system connecting the front and rear axles to the frame, the stub axles having steering cranks and being connected by king pins to the front axle so as to be steerable, a relay member formed by a second vertical shaft journalled on the front axle, a pair of links extending longitudinally along the underside of the frame and connected by universal joints to cranks extending from opposite sides of the vertical shafts and rigidly connected thereto, and a pair of track rods connected by universal joints to a crank arm on the second vertical shaft and extending to the steering cranks on the stub axles.

* * * * *

UNITED STATES PATENT OFFICE
CERTIFICATE OF CORRECTION

PATENT NO. : 3,899,188
DATED : August 12, 1975
INVENTOR(S) : Norman Royce Curry

It is certified that error appears in the above-identified patent and that said Letters Patent are hereby corrected as shown below:

Column 3, line 15, "front" should read -- rear --.

Signed and Sealed this twentieth Day of April 1976

[SEAL]

Attest:

RUTH C. MASON
Attesting Officer

C. MARSHALL DANN
Commissioner of Patents and Trademarks